Feb. 3, 1970   D. W. PAUTZ ET AL   3,493,235
SEALS FOR USE BETWEEN CONCENTRIC SHAFTS
Filed March 4, 1968   2 Sheets-Sheet 1
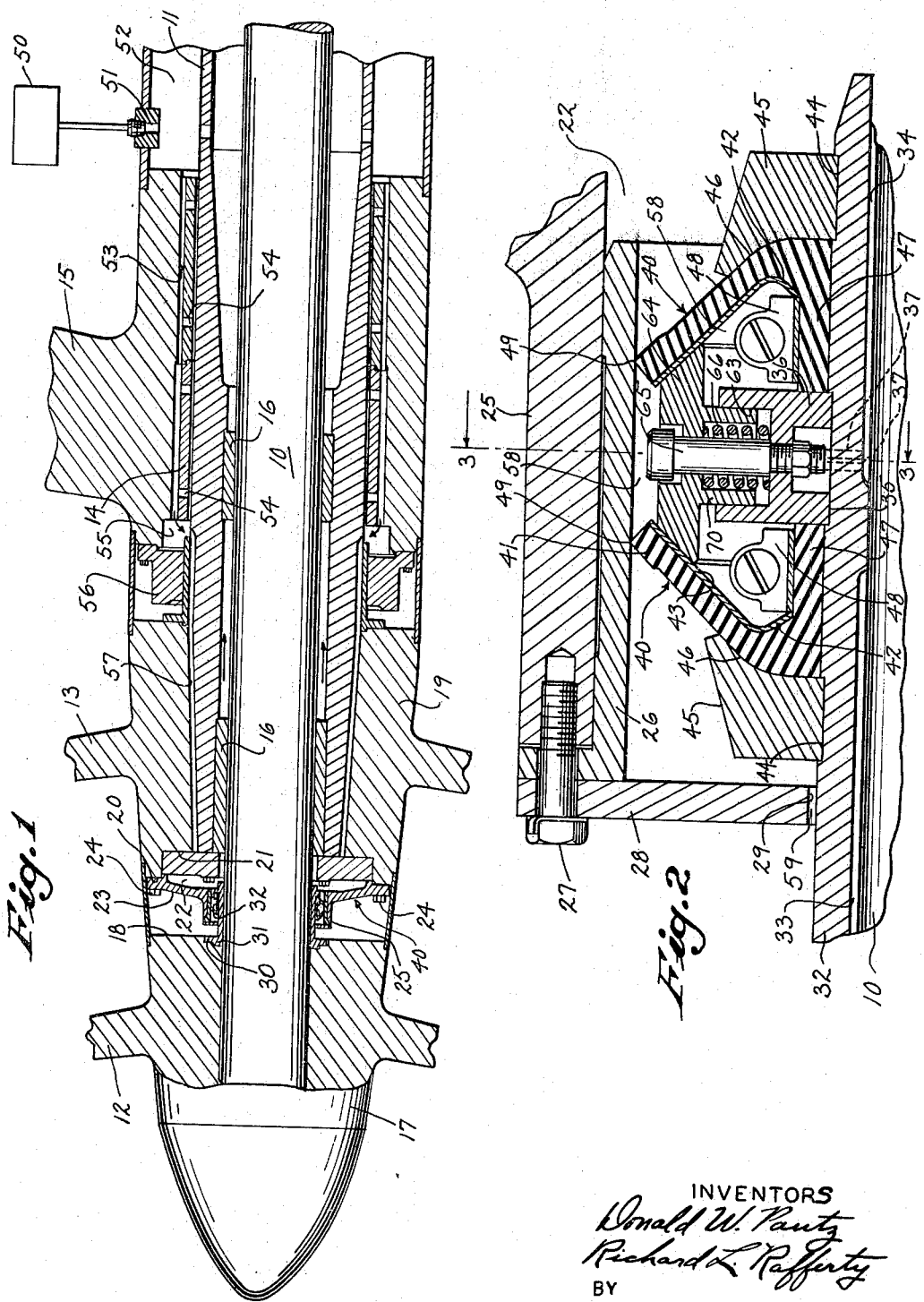
INVENTORS
Donald W. Pautz
Richard L. Rafferty
BY
Morsell & Morsell
ATTORNEYS Feb. 3, 1970 D. W. PAUTZ ET AL 3,493,235
SEALS FOR USE BETWEEN CONCENTRIC SHAFTS
Filed March 4, 1968 2 Sheets-Sheet 2
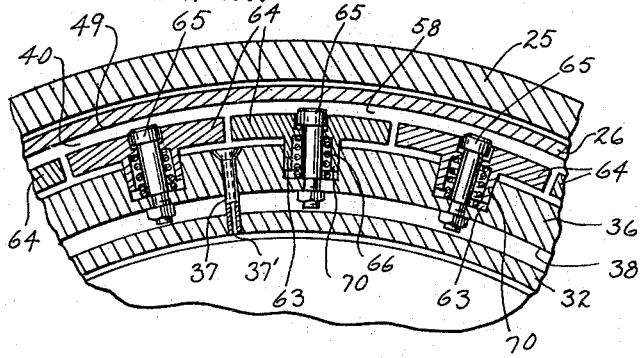
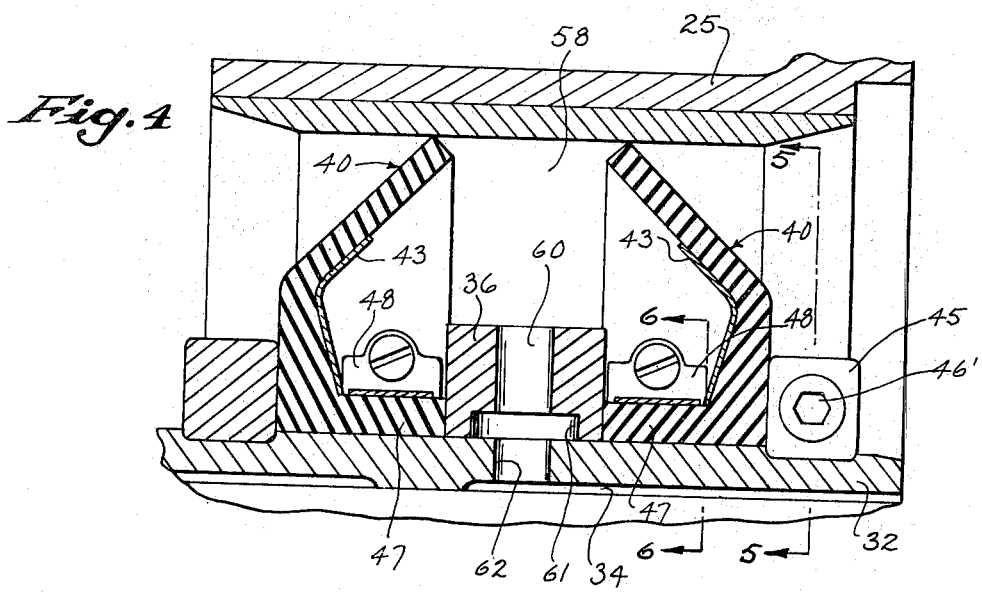
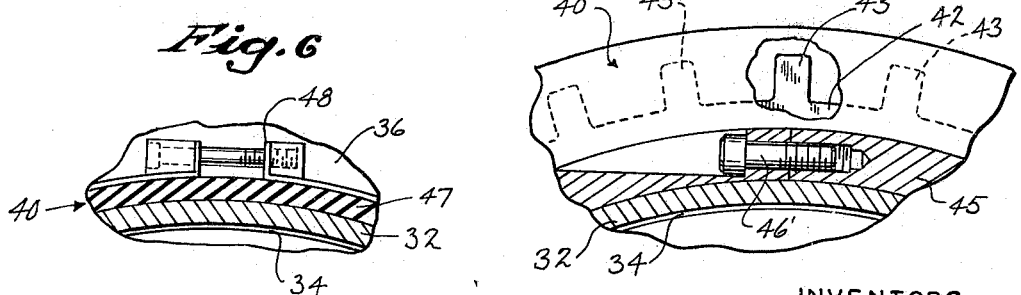
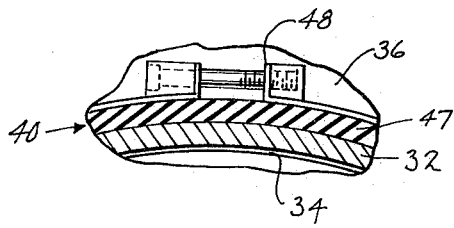
INVENTORS
Donald W. Pautz
Richard L. Rafferty
BY
Morsell & Morsell
ATTORNEYS United States Patent Office 3,493,235
Patented Feb. 3, 1970

3,493,235
SEALS FOR USE BETWEEN CONCENTRIC SHAFTS
Donald W. Pautz, Greenfield, and Richard L. Rafferty, Menomonee Falls, Wis., assignors to Waukesha Bearings Corporation, Waukesha, Wis., a corporation of Wisconsin
Filed Mar. 4, 1968, Ser. No. 710,020
Int. Cl. F16j 15/32, 15/54
U.S. Cl. 277—25                        14 Claims

ABSTRACT OF THE DISCLOSURE

A seal for use between an inner shaft and a concentric tubular outer shaft consisting of a liner around the inner shaft, spaced locating rings around the liner, a spacer ring between the locating rings, a flexible sealing element located between each locating ring and the spacer ring, and a clamping ring for each sealing element, there being oil fed to the annular space between the two sealing elements, the sealing elements having lips which are on the outer diameter so that centrifugal force will assist in maintaining the rubbing surfaces of said elements lubricated at all times during operation.

BACKGROUND OF THE INVENTION

Field of the invention

The present invention is particularly suitable for use on the propeller shafts of ships wherein there is a driven inner shaft within a tubular outer shaft, usually driven in opposite directions.

Description of the prior art

Heretofore, contra-rotating shafts as used in ships have employed water lubricated seals. The present invention recognizes that it is advantageous to use oil lubricated sealing means and discloses a novel arrangement which provides for such use, and which also prevents the sealing lips from running dry because of centrifuging oil.

SUMMARY OF THE PRESENT INVENTION

The present invention provides a seal which is particularly adapted for use between two concentric shafts rotating in opposite directions or at different speeds in the same direction, and it is a principal object to insure that the seal rubbing surfaces are always operating in oil in spite of possible centrifuging of oil by the shaft.

A further object of the invention is to provide in a device as above described a practical arrangement wherein the sealing lips seal on the OD so that they are urged by centrifugal force into sealing relationship.

A further object of the invention is to provide as one form of the invention a device as above described in which there is improved means for applying additional sealing force to the lips of the seals.

A more specific object of the last form of the invention is to provide a seal in which the additional sealing force is produced by means of segments which are urged radially outwardly by centrifugal force and by spring pressure, and which in turn act upon the sealing lips to urge the latter into sealing relationship.

A further object is to provide a construction in which the rotating spacer ring within the seal may be constructed to serve as a centrifugal pump to increas the oil pressure within the seal.

A further object of the invention is to provide a seal which is simple in construction and very simple to assemble.

With the above and other objects in view, the invention consists of the improved seal, and all of its parts and combinations, as set forth in the claims, and all equivalents thereof.

BRIEF DESCRIPTION OF THE DRAWINGS

In the accompanying drawings, in which the same reference numerals designate the same parts in all of the views:

FIG. 1 is a longitudinal sectional view showing the outer portion of a ship's propeller embodying the improved invention;

FIG. 2 is an enlarged detail view showing one form of the improved seal;

FIG. 3 is a sectional view taken on line 3—3 of FIG. 2;

FIG. 4 is a view similar to FIG. 2, showing a modification;

FIG. 5 is a fragmentary sectional view taken on line 5—5 of FIG. 4; and

FIG. 6 is a fragmentary sectional view taken on line 6—6 of FIG. 4.

DESCRIPTION OF THE PREFFERED EMBODIMENTS

Referring more particularly to the drawing, first to FIG. 1, the numeral 10 designates an inner propeller shaft of a ship which is suitably journalled for rotation, said shaft being concentrically disposed within an outer tubular shaft 11. In the embodiment illustrated the shafts 10 and 11 are contra-rotating shafts for use on a ship where contra-rotating propellers are desired, such as the propeller 12 on the inner shaft and the propeller 13 on the outer shaft. While the invention is particularly useful in connection with contra-rotating shafts it also has applicability to an arrangement where there are two concentric shafts rotating at different speeds in the same direction. The outer shaft is suitably journalled in a babbitted bearing 14 carried by a stationary frame portion 15 of the ship, and the inner shaft rotates in bearing sleeves 16 within the tubular shaft 11. The propeller 12 has a hub portion 17 with an inner end face 18. The propeller 13 has a hub portion 19 formed by an enlargement of the shaft 11 and having an outer end face 20 with peripherally spaced recesses 21 communicating with an annular oil chamber 22. An annular shield 23 or shaft extension which is L-shaped in cross section as shown in FIG. 2 is bolted as at 24 to the end face portion 20 of the hub for the propeller 13. This shield has an integral ring-shaped portion 25 which is concentric with the shafts and which is spaced from the shaft 10 to provide an annular seal-accommodating space. A flanged metal liner 26 has its flange portion bolted as at 27 to an end edge of the ring 25 and these bolt also hold a washer-like member 28 in position, the latter having a central opening 29.

The end face 18 of the hub for the propeller 12 has an annular double undercut portion 30 for receiving a correspondingly shaped flange 31 of an annular liner 32 which surrounds the inner shaft 10 and is rotatable therewith. The liner has annular grooves 33 and 34 in its underside, the groove 34 communicating with the oil space 22.

The outer diameter of the liner has an annular groove 35 for receiving a spacing ring 36. This spacing ring may be held in position by any suitable means such as bolts 37, preferably about a dozen equally peripherally spaced, each bolt having an oil hole 37', which communicates with the annular oil groove 34 between the liner 32 and the inner shaft 10. There is also a circular groove 38 in the under side of the spacer ring.

Positioned on each side of the spacing ring 36 is an annular sealing element 40 each of which is generally J-shaped in cross section and includes a sealing lip portion 41. Each sealing element 40 is formed of rubber, leather, synthetic rubber such as nitriate, Buna-N, plastic, or other suitable flexible sealing material. Bonded to the inner side of each flexible sealing lip is a metal ring 42 having upwardly projecting spring steel fingers 43, as shown in FIG. 5.

Mounted in liner grooves 44 on each side of the sealing elements 40 are metal locating rings 45. These have curved inner faces 46, and there are bolts 46' for drawing the ends of the rings together during assembly (see FIG. 5). Thus the base portion 47 of one sealing element 40 is held between a locating ring and one side of the spacer ring 36, and the base portion 47 of the other sealing element is held between the other locating ring and the other side of the spacer ring 36. Each base member is clamped to the liner 32 by a hose clamp 48 (see FIG. 6). The curved inner faces 36 of the locating rings maintain the sealing lips bent obliquely toward one another as shown in the drawing so that there is an annular corner 49 of each sealing lip which makes rubbing contact with the liner 26.

The lubricating oil which is contained in a head tank 50 is fed through an oil hole 51 into an annular space 52 surrounding the outer shaft 11. This oil is under the static pressure of the head tank or is pressurized by other means such as a pump, this pressure being about 20 p.s.i. or whatever pressure is needed to maintain the oil pressure somewhat higher (usually 4–5 p.s.i. higher) than the pressure of the sea water at the depth of the propeller. This oil flows through the axial ducts 53 which communicate with radial ducts 54 which provide lubrication between the shaft 11 and the babbitted bearing 14. The oil also flows into an annular space 55 adjacent a seal 56 of a conventional type. Then the oil flows through ducts 57 into the annular stagnant annular oil space 22 adjacent the improved sealing assembly. Most of this oil returns as indicated by the arrows to provide lubrication between the inner shaft and its bearings. Some of the oil, however, enters the groove 34 beneath the liner 32 and flows through the oil holes 37' into the chamber 58 within the seal assembly.

In the arrangement illustrated in FIG. 4, the spacer ring 36 has peripherally spaced oil holes 60 communicating with an annular groove 61 which in turn communicates through four or more holes 62 with the oil recess 34. Thus the spacer ring of FIG. 4, when rotating with the inner shaft 10, acts as a centrifugal pump to increase the oil pressure within the chamber 58. In certain constructions it may be desirable to have this centrifugal pump action of FIG. 4. In other cases the oil can merely flow under the head pressure from the groove 34 through ports 37' of FIGS. 2 and 3 into the chamber 58.

In the form of invention illustrated in FIG. 1 the spacer ring has bores 63, each adapted to receive the depending boss 70 of a force exerting segment 64. Each segment extends about 15° and there are enough segments to complete the circle. The tubular bosses 70 are radially slidably mounted in the bores 63. Bolts 65 hold the segments in position, the segments being slidable on the stems of the bolts, and each bolt being surrounded by a spring 66.

OPERATION

During operation the oil within the chamber 58 is always maintained at a pressure higher than the pressure of the sea water at the particular depth. Thus, sea water which may enter through the clearance space 59 between the bore 29 of the washer-like member 28 and the liner cannot travel past the sealing lips because the greater oil pressure within the sealing assembly maintains the lips in sealing contact at 49, the liner 26 usually being rotated in a reverse direction to the liner 32. In addition, centrifugal force acts on the sealing lips 41 to constantly urge them into sealing engagement, and the oil in the cavity 58 of the sealing assembly is constantly centrifuged outwardly to maintain the sealing lips thoroughly lubricated at their annular line of contact 49.

In the form of the invention of FIG. 1, when the inner shaft rotates the segments 64 are moved radially outwardly under the action of centrifugal force, aided by the springs 66 to constantly engage the spring fingers 43 and urge the lips 41 into engagement with the liner 26. When the shaft is not rotating the springs 66 exert a light pressure.

It is apparent that, during manufacture, the assembly of the different members which make up the sealing assembly on the liner in a very simple matter. This is due to the novel arrangement wherein each base 47 is retained between one side of a spacer ring and a locating ring, it being merely necessary to use a simple hose clamp at the bases of the sealing elements. It is also clear that replacement of these seals is relatively simple.

Various changes and modifications may be made without departing from the spirit of the invention, and all of such changes are contemplated as may come within the scope of the claims.

What we claim is:

1. In combination with an inner rotatable shaft and a concentric outer shaft, a seal assembly connected to said inner shaft for rotation therewith, said seal assembly having flexible annular lips projecting outwardly and spaced apart to provide an annular oil-receiving space therebetween, extension means connected with said outer shaft and having an annular portion concentric with said inner shaft with which said lips are in rubbing contact, and means for delivering oil into said oil-receiving space whereby the oil is centrifuged during rotation of the inner shaft to maintain said lips in lubricated condition.

2. A combination as recited in claim 1 in which the spaced lips project at an oblique angle toward one another.

3. A combination as recited in claim 1 in which said shafts are contra-rotating.

4. A combination as recited in claim 1 in which there is an integral annular base portion for each sealing lip, which base portions surround the inner shaft.

5. A combination as recited in claim 4 in which there is a spacer ring surrounding the shaft between the base portions for the flexible sealing lips.

6. A combination as recited in claim 4 in which there is force exerting means within the annular space between sealing lips having opposite annular portions positioned to engage the inner sides of said lips, said force exerting means being mounted for outward radial movement in response to the action of centrifugal force to aid in urging the sealing lips into sealing contact.

7. A combination as recited in claim 6 in which there is spring means also urging said force exerting means outwardly.

8. A combination as recited in claim 5 in which the means for delivering oil to the space between the sealing lips includes peripherally-spaced radial holes in the spacer ring.

9. A combination as recited in claim 8 in which there is means associated with the radial holes to cause the latter to centrifugally pump oil during rotation of the inner shaft.

10. A combination as recited in claim 5 in which there is a locating ring on the outer side of each flexible sealing lip.

11. A combination as recited in claim 10 in which each locating ring is shaped to maintain its sealing lip in an oblique position.

12. A combination as recited in claim 1 in which the seal assembly is mounted on an annular liner member which is rotatable with the inner shaft, and in which the means for delivering oil includes ducts in said liner.

13. A seal assembly comprising an annular liner spaced annular sealing elements having ring shaped bases on the outer periphery of said liner and having sealing lip portions projecting obliquely toward each other, a spacing ring on the liner between said bases, and a locating ring on the outer side of each sealing element, each ring being shaped to maintain its sealing lip in an oblique position.

14. A seal assembly as claimed in claim 13 in which there is force exerting means within the annular space between sealing lips having opposite annular portions positioned to engage the inner sides of said lips, said force exerting means being mounted for outward radial movement in response to the action of centrifugal force to aid in urging the sealing lips into sealing contact.

References Cited

UNITED STATES PATENTS

| 2,210,823 | 8/1940 | Victor et al. | 277—25 |
| 2,786,699 | 3/1957 | Kurti | 277—25 |
| 2,888,281 | 5/1959 | Ratti | 277—25 |

SAMUEL ROTHBERG, Primary Examiner

U.S. Cl. X.R.

277—59, 70